(12) United States Patent
Dutton

(10) Patent No.: US 7,446,675 B2
(45) Date of Patent: *Nov. 4, 2008

(54) SOLID STATE AVIONICS DISPLAY INSTRUMENT

(75) Inventor: Marcus F. Dutton, Canton, GA (US)

(73) Assignee: L3 Communications Corporation, New York, NY (US)

( * ) Notice: Subject to any disclaimer, the term of this patent is extended or adjusted under 35 U.S.C. 154(b) by 429 days.

This patent is subject to a terminal disclaimer.

(21) Appl. No.: 11/318,652

(22) Filed: Dec. 27, 2005

(65) Prior Publication Data

US 2007/0152848 A1 Jul. 5, 2007

(51) Int. Cl.
*G08B 21/00* (2006.01)
(52) U.S. Cl. ...................................................... 340/945
(58) Field of Classification Search ................. 340/945, 340/815.4, 815.44, 815.53; 345/7; 359/630
See application file for complete search history.

(56) References Cited

U.S. PATENT DOCUMENTS 5,739,771 A * 4/1998 Fisher .......................... 340/978

* cited by examiner

*Primary Examiner*—Phung Nguyen
(74) *Attorney, Agent, or Firm*—Gardner Groff Greenwald & Villanueva P.C.

(57) ABSTRACT

A solid-state electronic avionics display instrument includes a needle-like display mounted within a housing in a manner that emulates the manner in which prior electro-mechanical needle indicator mechanisms have been mounted in such housings so as to indicate a value along an arcuate scale. New aircraft can be fitted with such instruments initially, while existing aircraft can be retrofitted with such instruments to replace existing electro-mechanical mechanism-based avionics instruments.

19 Claims, 5 Drawing Sheets

SOLID STATE AVIONICS DISPLAY INSTRUMENT

BACKGROUND OF THE INVENTION

1. Field of the Invention

The present invention relates generally to avionics instrumentation and, more specifically, to outfitting and/or retrofitting aircraft with electronic instruments.

2. Description of the Related Art

Aircraft cockpit flight instrumentation (avionics) indicators may employ a variety of mechanisms, including vertical scale indicator mechanisms, radial dial indicator mechanisms, and pivoting mechanisms, such as those of compasses and attitude gyro indicators.

Many avionics indicators have long been entirely electro-mechanical, with needle pointers, rotating wheels, bands, spheres and so forth moving over or within a fixed dial or housing. For example, a needle pointer gauge that is used to indicate an operating pressure or temperature commonly has a circular housing, with a scale printed circumferentially along its perimeter, and a pointer needle that pivots about a central axis and alongside the scale to indicate the temperature or pressure. A pilot can, for example, determine at a glance that a measured temperature or pressure is abnormal when the pointer needle is pointing to a point above or below where it normally points during nominal conditions. A pilot can read the specific temperature or pressure by noting the point on the scale to which the pointer needle points.

Although fully solid-state display-based technologies, such as multi-function display instruments, have begun to supplant electro-mechanical indicators in newer commercial and military aircraft, in many existing aircraft the older, electro-mechanical indicators are still very common. For example, in general aviation (i.e., small private aircraft) pilots and regulatory authorities have been slower to accept changing over to solid-state display-based technologies. This is so in part because general aviation pilots generally are more accustomed to the appearance of mechanical instruments. For example, in older CESSNA CITATION aircraft, electro-mechanical vertical scale indicators are used to indicate fuel flow, inter-turbine temperature, fan speed and turbine speed. It would be desirable to retrofit such older aircraft with solid-state electronic display-based instruments, but retrofitting these aircraft with the latest multi-function display instruments generally is impractical and costly because their form factors differ greatly from those of the original instruments, and it can be difficult to obtain approval from regulatory authorities.

Accordingly, it can be seen that a need yet exists for a method and apparatus to replace existing electro-mechanical avionics display instruments, while allowing the replacement instrument to be fitted within the existing openings of the aircraft. It is to the provision of such a method and apparatus that the present invention is primarily directed.

SUMMARY OF THE INVENTION

Briefly described, in a first preferred form the present invention comprises a replacement avionics display instrument for use in existing aircraft to replace an instrument having an electro-mechanical display. The replacement avionics display instrument comprises an avionics housing either removed from such an aircraft or constructed to replicate the same. If the housing is one removed from an aircraft, the existing electro-mechanical display is removed. In place of the electro-mechanical display in the original instrument, an electronic display is substituted in the replacement avionics display instrument. In one form, the electronic display can comprise an LED display. In another form, the electronic display can comprise an LCD display. The replacement avionics display further includes electronic circuitry to allow the electronic display to be driven by the electrical input signals formerly (or normally) driving the electro-mechanical display. In other words, the replacement avionics display can be connected to the electrical inputs of the aircraft and installed in the existing opening in the aircraft without requiring any modification to the aircraft. Advantageously, this allows modern instrument technology to be retrofitted into older aircraft in a simple, direct and relatively inexpensive manner.

As described above, one way to accomplish this is to re-use the old avionics instrument housing. Alternatively, a reasonable facsimile of the housing can be fabricated and used instead of the old housing. Such might be preferable in situations where the old housing is damaged, corroded, etc.

One ready application for such a hybrid or replacement instrument is to replace electro-mechanical needle indicator instruments. These are particularly attractive targets for such a replacement instrument due to the relatively high cost of repairing or replacing the electro-mechanical needle indicator movements contained within the instrument.

In another preferred form the invention comprises a solid-state electronic avionics needle scale indicator that includes one or more needle-like displays mounted within a housing in a manner that emulates the manner in which prior electro-mechanical indicator mechanisms have been mounted in such housings so as to indicate a value along a peripheral readable scale. Solid-state displays are not only more reliable than electro-mechanical mechanisms but also can be easier for pilots to read because they are generally clearer and brighter. Electronic circuitry in the housing interfaces the display with input signals received from aircraft sensors, such as for example of the type commonly included in general-aviation aircraft, such as fuel level sensors, inter-turbine temperature sensors, fan speed sensors, altitude, hydraulic pressure, etc.

In one aspect of the invention, existing electro-mechanical needle indicators that have been installed in such aircraft or that are intended for installation in such aircraft can be replaced with electronic displays emulating the electro-mechanical needle displays. Retrofitting such indicators in this manner or, alternatively, providing new indicators that otherwise appear similar to those that have long been used in general-aviation aircraft but employing electronic LED (or LCD) displays instead of electro-mechanical mechanisms, is economical and promotes pilot confidence and the acceptance of such replacement indicators by regulatory authorities.

In another form, the present invention comprises a method of retrofitting avionic display instruments, the avionics display instrument being of the type having a housing containing an electro-mechanical movement adapted to be driven by electrical input signals from an aircraft to which the avionics display instrument is mounted. The method includes the steps of removing the avionics display instrument from the aircraft and removing the electro-mechanical movement from the housing of the avionics display instrument. The method also includes the step of mounting an electronic display in the housing in place of the electro-mechanical movement, the solid state electronic display being adapted to be driven by the same electrical input signals as the original avionics display instrument. The method also includes the step of remounting the avionics display instrument in the aircraft.

DETAILED DESCRIPTION

Figure 1A:
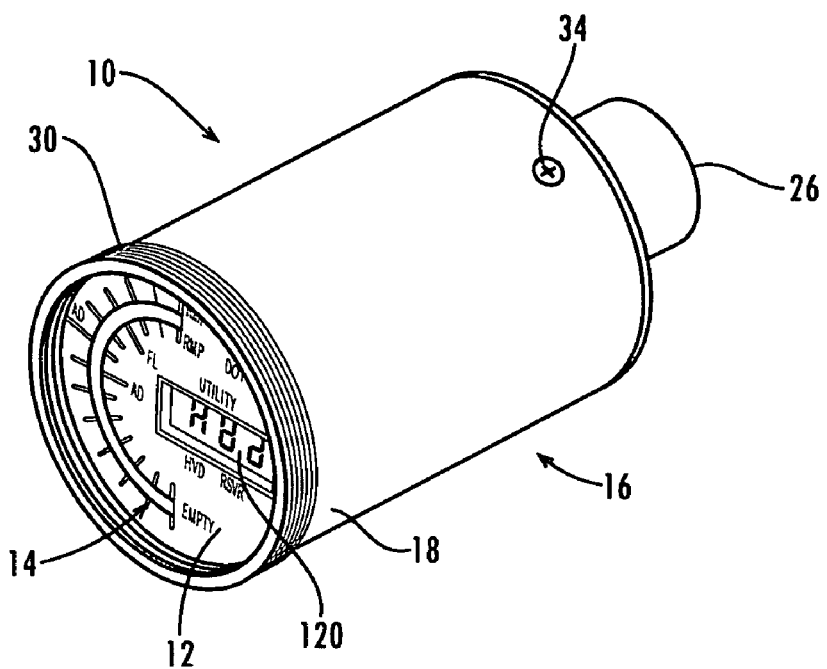
FIG. 1A and FIG. 1B are perspective front and rear views of a replacement avionics display instrument for use in new or existing aircraft according to a preferred form of the present invention, here illustrated as having a simulated needle indicator.

In the following description, like reference numerals indicate like components to enhance the understanding of the invention through the description of the drawings. Also, although specific features, configurations and arrangements are discussed below, it should be understood that such is done for illustrative purposes only. A person skilled in the relevant art will recognize that other steps, configurations and arrangements are useful without departing from the spirit and scope of the invention.

Figure 1B:
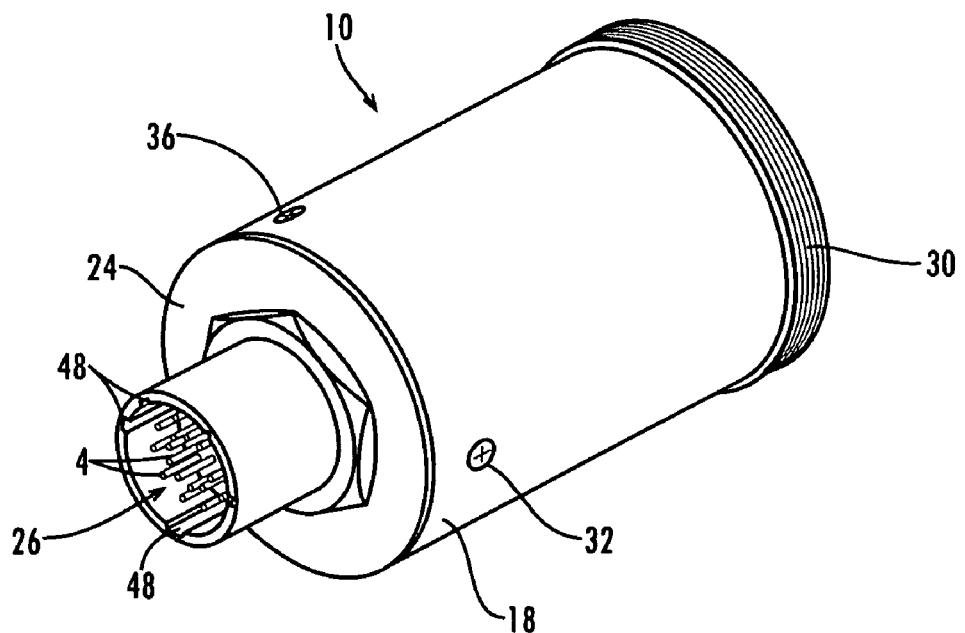

FIG. 1A and FIG. 1B are perspective front and rear views of a replacement avionics display instrument 10 for use in existing aircraft according to a preferred form of the present invention, here illustrated as having a faceplate 12 with a simulated needle indicator or LED display 14. The replacement avionics display instrument 10 utilizes highly reliable solid-state technology to display information to the crew.

Figure 3:
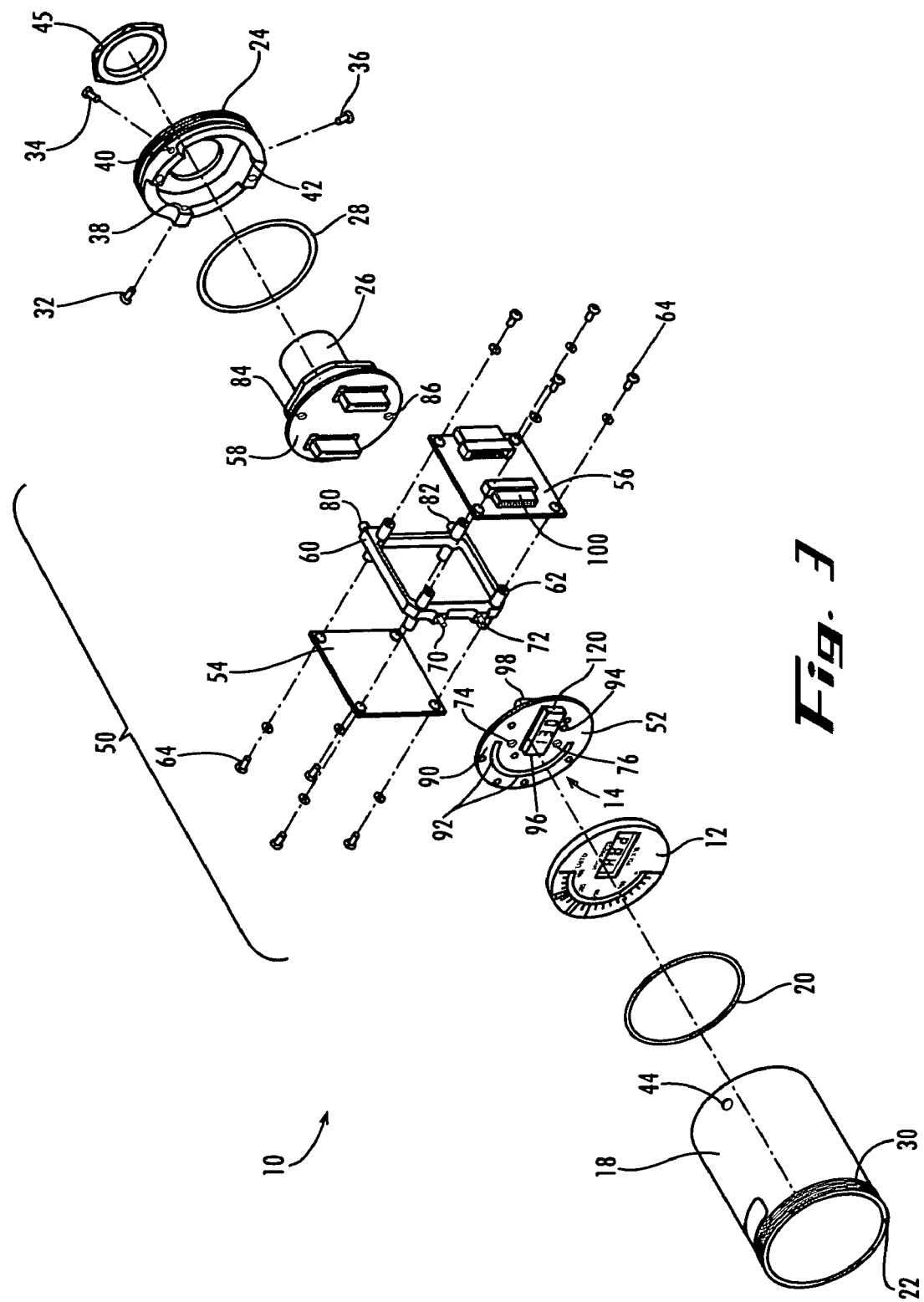
FIG. 3 is an exploded perspective view of the replacement avionics display instrument of FIGS. 1A and 1B.

As shown in FIGS. 1A, 1B, and 3, the avionics display instrument 10 includes a housing or casing 16. The casing 16 can be that of an existing instrument or it can be similar to such a housing. As shown more clearly in FIG. 3, the casing 16 includes a tubular body 18, a glass cover 20 for the front of the tubular body, a suitable bezel 22 for retaining the glass cover, and a backplate or rear cap 24, which together provide an enclosed structure. A rear coupling connector 26 extends from the rear cap 24. In the depicted example, the bezel 22 has an approximately two-inch diameter, and the tubular body 18 is approximately 1.932 inches long with a wall thickness of about 0.060 inch. The casing 16 itself can have an approximately two-inch diameter and a depth of about 2.75 inches, exclusive of the rear coupling connector 26, although those skilled in the art will understand that the casing can be any suitable size for use with a cockpit control panel. Preferably, the bezel 22, tubular body 18, and rear cap 24 are fabricated from aluminum and are conversion coated and painted black for corrosion protection. Also preferably, the glass cover 20 provides an ITO coating for EMI protection and is epoxied to the bezel. Additionally, the glass cover 20 is preferably transparent or translucent so that the user can easily read the faceplate 12 therebehind. To ensure a good environmental seal, the bezel 22 can be soldered to the tubular body 18, and the rear cap 24 can incorporate an O-ring seal 28. Moreover, a resilient gasket 30 is provided at the end of the casing 16 having the glass cover 20, such as a rubber gasket, surrounding the casing for providing a seal and resilient mounting between the instrument 10 and the instrument panel.

Preferably, the rear cap 24 is attached to the tubular body 18 by installing a plurality of fasteners, preferably three countersunk screws 32, 34, and 36, through a plurality of openings 38, 40, and 42, in the casing 16 and into openings 44 (only one of which is shown in the figures) in the rear cap. Those skilled in the art will understand that various types of fasteners, as well as the number of fasteners, and fastening techniques can be employed without deviating from the scope of the present invention. A rear hex nut 45 is threaded on to a threaded portion of the connector 26 to secure the rear cap 24 the connector. Preferably, lightweight components and materials are used to minimize the overall weight of the instrument 10. In one embodiment, the estimated weight of each instrument 10 is approximately 0.47 pounds, although those skilled in the art will understand that the weight can vary.

The generally cylindrical rear coupling connector 26 of the rear cap 24 located on the back of the instrument 10 is part of an electronic subassembly 50 (see FIGS. 2 and 3) and receives input signals from one or more avionics sensors (not shown) when the instrument 10 is installed in an aircraft and communicates these input signals to circuitry in the electronic subassembly 50. Preferably, the instrument 10, through the rear coupling connector 26, can interface directly with aircraft power and with the sensor signals that provide the data to be displayed. Also preferably, the instrument 10 can be self-contained such that no external signal conditioning electronics would be required.

The rear coupling connector 26 includes a plurality of male connector pins 47 for mating with female connectors in a wiring harness of the instrument control panel. Typically, the rear coupling connector 26 is "keyed" to ensure proper connection of the cabling to the instrument 10. As shown more clearly in FIG. 1B, in this regard the rear coupling connector has at least one and preferably a plurality of grooves 48 arranged in a particular configuration for mating with one or more ribs on the instrument panel port (not shown). Preferably, the grooves 48 extend from the distal end of the rear connector 26 to the rear cap 24 or to some point between the distal end and the rear cap. Also preferably, the pins 47 of the rear connector 26 do not extend all the way to the distal end of the rear coupling connector. Thus, the pins 47 are protected from being inadvertently damaged.

Figure 2:
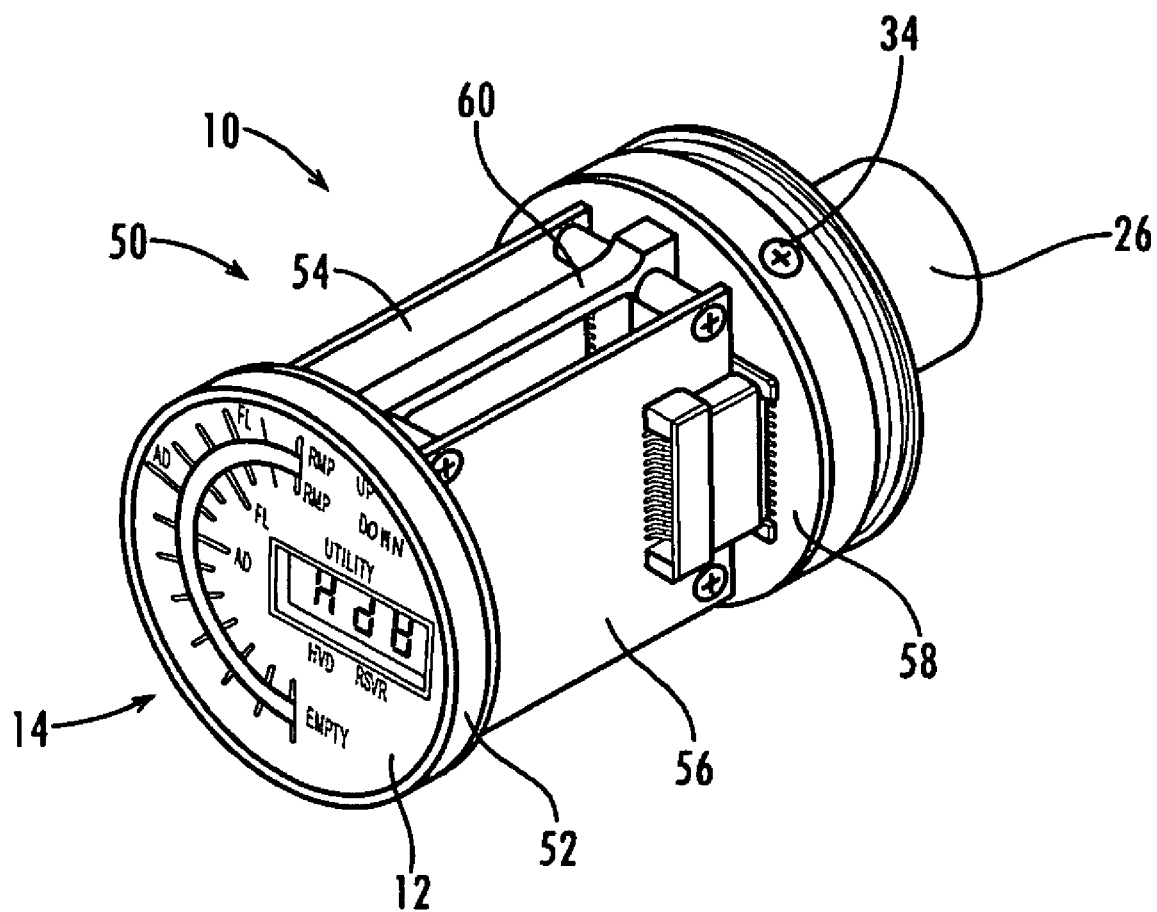
FIG. 2 is a perspective view of the replacement avionics display instrument of FIGS. 1A and 1B shown with a housing portion thereof removed.

The faceplate 12 is positioned behind the glass cover 20 of the instrument 10 and is described in more detail below with reference to FIGS. 4A and 4B. The electronics subassembly 50 is positioned behind the faceplate. The electronics subassembly 50 includes an LED circuit card assembly (hereinafter referred to as "CCA") 52, a power supply CCA 54, a system controller CCA 56, and a connector CCA 58, all of which are structurally connected to one another by a carrier or support frame 60, as shown in FIGS. 2 and 3. Preferably, the interfaces between the circuit card assemblies are implemented with male/female multi-pin socket connectors to minimize assembly time and facilitate service and repair.

The carrier 60 is a generally rectangular rigid frame that includes four threaded connectors 62 at or near its corners on each side for connecting the power supply CCA 54 to one side and the system controller CCA 56 to the opposite side. The power supply CCA 54 has openings in its corners, which generally align with the connectors 62 of the carrier 60. The system control CCA 56 has openings in its corners, which generally align with connectors of the carrier 60 on the opposite side. Thus, the power supply CCA 54 can be connected to one side of the carrier 60 by securing four fasteners 64, such as screws, through each opening in the power supply CCA 54 and into the connectors 62 of the carrier 60. Optionally, the connectors 60 can comprise self-locking inserts to prevent unintended loosening of the screws. Similarly, the system controller CCA 56 can be connected to the opposite side of the carrier 60 by securing four fasteners 64, such as screws, through each opening in the system controller CCA 56 and into the connectors 62 of the carrier.

Additionally, the carrier 60 includes nubs or indexing pins on its front and rear surfaces for connecting the LED CCA 52 to its front and the connector CCA 58 to its rear. Preferably, two nubs 70 and 72 located on the front surface of the carrier 60 mate with openings 74 and 76 of the LED CCA 52 so as to position the LED CCA relative to the carrier. Two nubs 80 and 82 located on the rear surface of the carrier 60 mate with openings 84 and 86 of the connector CCA 58 to position the connector CCA relative to the carrier.

Those skilled in the art will understand that the carrier 60 can have various shapes, sizes, and configurations and be within the scope of the present invention. Moreover, various fasteners 64 and fastening techniques can be employed to attach the various circuit card assemblies to the carrier without deviating from the scope of the present invention. In an alternative embodiment, no carrier is used, but instead the circuit card assemblies can be coupled more or less directly to one another with electrical couplings that also serve as the mechanical couplings.

The LED CCA 52 includes a plate 90 with a display 14 of a plurality of LEDs 92 (light emitting diodes) arrayed adjacent to one another and in the form of an arc in which a selectable length or band can be displayed. Additionally, the LED CCA 52 includes additional LEDs 94 behind lettering and scales on the faceplate 12 so that such scales are visible in low light. Optionally, one or more of the additional LEDs 94 can be an indicator light for indicating an atypical condition. Preferably, an ambient light sensor 96 on the front of the plate 90 of the LED CCA senses the ambient light level and transmits the ambient light level back to the system controller CCA 56, as described in more detail below.

In the depicted embodiment, thirty-nine LEDs 92 are used to display the current hydraulic pressure, although those skilled in the art will understand that fewer or more LEDs can be used to accomplish a satisfactory result. The more LEDs that are activated, the longer the band appears. Thus, when the electronics subassembly 50 receives an input signal from an aircraft sensor, such as a sensor for hydraulic pressure, it activates a number of adjacent LEDs 92 in proportion to the hydraulic pressure represented by the input signal. A pair of connector sockets 98 (only one of which is shown in the figures) having male connector pins is located on the back of the plate 90, which mate with sockets 100 of the system control CCA 56 and power supply CCA having female connector pins.

Figure 4A:
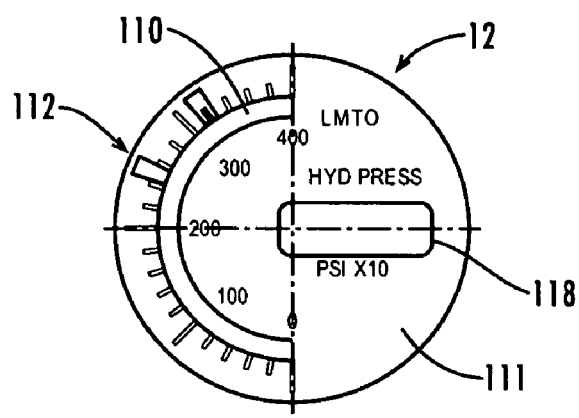
FIGS. 4A and 4B are front and perspective views of a faceplate portion of the replacement avionics display instrument of FIGS. 1A and 1B.
Figure 4B:
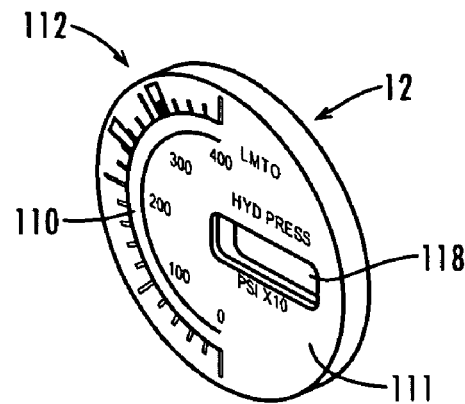
Figure 4C:
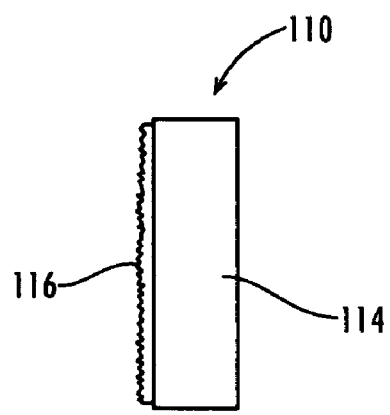
FIG. 4C is a side sectional view of a portion of the faceplate portion of FIGS. 4A and 4B.

Referring now to FIGS. 4A and 4B, the faceplate 12 includes a generally arced or banana-shaped diffuser lens 110 set in a display disk 111 showing a scale or legend 112. The diffuser lens 110 provides a sharp transition from light to dark and blends the light emitted from individual LEDs 92 together. As shown in more detail in FIG. 4C, the diffuser lens 110 includes a base 114, typically constructed of a clear acrylic, and a film 116 adhered to the base. Preferably, the film 116 is black (or dark) and translucent and has a textured surface, preferably a somewhat nubbly outer surface. The base 114 of the diffuser lens 110 can be the faceplate 12 itself with the translucent black film 116 applied thereon. Alternatively, the diffuser lens 110 can be a separate piece inserted and secured in a complementing aperture in the faceplate 12. The diffuser lens 110 can be constructed of commercially available lens material, such as that used in front of rear projection televisions. Preferably, the diffuser lens 110 permits viewing at side viewing angles, and is thus readable over viewing angles of +/−60 degrees horizontal and +/−30 degrees vertical. The diffuser lens 110 can be treated to minimize reflected glare.

The scale or legend 112 can be painted or printed on the faceplate 12, etched into the faceplate, or applied as a decal or sticker to the faceplate. Those skilled in the art will understand that various methods and techniques may be used to create the scale 112 and still be within the scope of the present invention. In one embodiment, white indicia are applied on a black background so as to provide an easy-to-read legend in daylight mode. The scale or legend 112 can be backlit with green LEDs at night to appear green on a black background for better visibility. Optionally, the faceplate 12 can include a generally rectangular-shaped aperture 118 for viewing an optional secondary, digital display 120 of the LED CCA 52 (see FIG. 3).

Figure 4D:
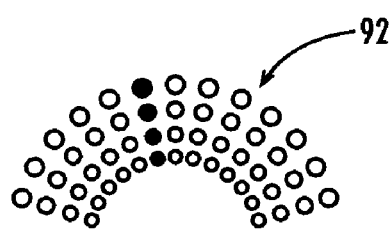
FIG. 4D is a pictorial representation of an LED display for the replacement avionics display instrument of FIGS. 1A and 1B according to another exemplary embodiment of the present invention.

The LEDs 92 of the LED CCA 52 appear through the generally banana-shaped diffuser lens 110 in the faceplate. In one embodiment, the LEDs 92 in the linear array sequentially light to create a continuous light bar from the minimum reading on the instrument 10 to the current, sensed value. Alternatively, the LEDs 92 can be operated so that only one or a few LEDs are illuminated at any one time, to more closely approximate the look of a conventional needle. In still another embodiment, the LEDs 92 can be arranged as shown in FIG. 4D so as to more look more like a conventional, mechanical needle. The resolution of data that may be presented can be limited by the minimum physical spacing that can be achieved between adjacent LEDs 92. In general, this resolution is sufficient to meet the requirements in many applications. The LED arc presentation provides the quick-look indication of current status that is required for most references to the indicator by the crew.

In the depicted embodiment, the LEDs 92 preferably are green, bright, and moderately narrow band emitters having a peak output between about 520 and about 530 nanometers (nm). Also preferably, this energy is filtered to remove the "tail" of the output band beyond 600 nm, to allow compatibility with Generation III Night Vision devices. Preferably, the indicia of the scale 112 are white for daytime use, but are transilluminated for nighttime use with filtered green lighting.

In addition to the LED display 14, which is the primary indicating means, the instrument 10 can optionally include, as secondary indicating means, a digital display 120 that numerically displays the same quantity represented by LED display 14 simultaneously with the lighting of the LEDs 92. The digital display 120 can include a three digit, seven segments per digit, readout of the current sensed value. In embodiments of the invention in which the digital display 120 is included, a pilot can choose to read either type of display according to his or her preference. Many pilots are accustomed to instruments that are similar in appearance and function to the primary means, and therefore may prefer to read the LED display 14. This digital display 120 may be useful in instances when a crewmember, for examples, wants to evaluate a specific indication in detail. Alternatively, other arrangements can be employed and still be within the scope of the present invention.

Although the seven-segment LED 120 is intended for the display of numerals, the LED display can also show nonnumeric characters. For example, if the instrument 10 is reading a level in a reservoir, then the LED 120 can show "FUL" if the reservoir is full, and "ADD" if the reservoir is not full and if fluid should be added. In one embodiment, readings between the minimum and the "ADD" level result in the display of the legend "ADD" in the seven-segment LED 120. Sensor readings between the "ADD" level and the "FULL" level result in the seven-segment display 120 being blank. Sensor readings above the "FULL" level will result in the legend "FUL" being displayed in the seven-segment display 120. Additionally, because reservoir indicators generally display the "ADD" and "FUL" legends associated with two different scales (ramp up and ramp down), preferably, the instrument 10 includes a discrete signal as an input that defines whether the ramp is up or down. This discrete signal may be generated by a position-sensing switch located at the ramp or by a manual switch located on the instrument control panel.

Figure 5:
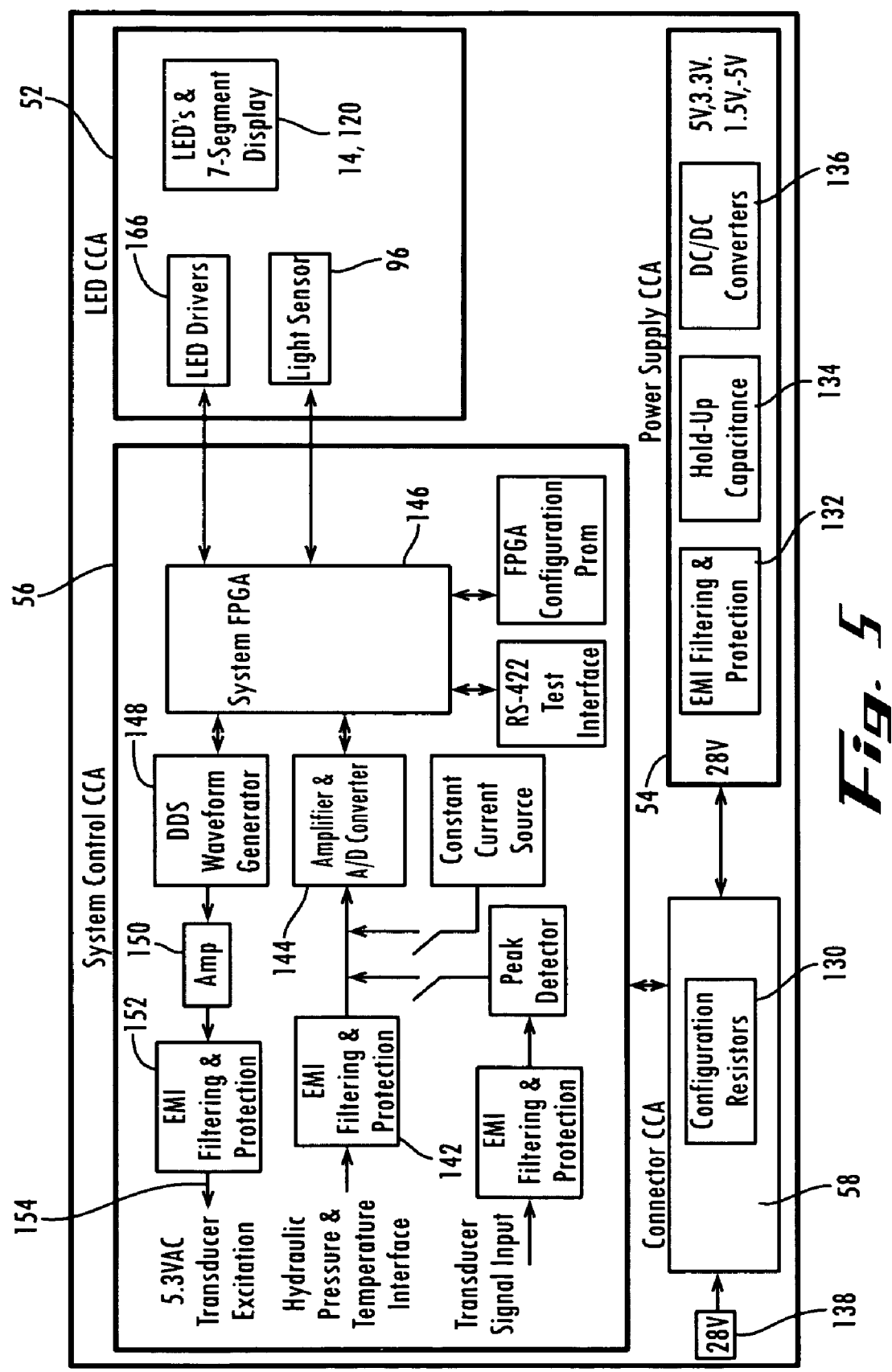
FIG. 5 is a schematic illustration depicting electronic circuitry of the replacement avionics display instrument of FIGS. 1A and 1B.

Referring now to FIG. 5, the electronic circuitry of the replacement avionics display instrument 10 is depicted in a generally functional manner. The connector CCA 58 can be a motherboard having connector sockets that provide an interface between the connector CCA, the power supply CCA 54, and the wiring harness in the instrument control panel. Preferably, the connector CCA 58 includes a set of configuration resistors 130 that define the identity of the gauge to the system control CCA 56 in order to determine which interface to use. Also preferably, there are no active components on the connector CCA 58.

The power supply CCA 54 connects directly into the connector CCA 58 through male/female multi-pin connector sockets and is responsible for protecting, filtering, and converting the input from a power supply to lower voltages. Transient clamping and EMI filtering 132 provide protection for MIL-STD-461E testing. Hold-up circuitry 134 provides the required hold-up during power interrupts. A DC to DC converter 136 converts input from a power supply, typically from a 28V DC power supply 138 (of the aircraft), to lower voltages of 5V, −5V, 3.3V, and 1.5V DC. In one embodiment, the estimated power used by the entire gauge is approximately 5 W at maximum brightness. Because power dissipation is low (approximately less than five watts at maximum brightness), the use of a fan to provide cooling air to the indicators is obviated.

The system control CCA 56 connects directly into the connector CCA 58 through male/female multi-pin connector sockets and is responsible for interfacing with the hydraulic pressure transmitters, resistance temperature detectors, and fluid level transducers. Preferably, these inputs are filtered by an EMI filter and protector 142, amplified and then converted into a digital value by an amplifier and an Analog/Digital Converter (ADC) 144. In one embodiment, a field-programmable gate array (FPGA) 146 reads the ADC value and then calculates the appropriate pressure, temperature, or reservoir level. The appropriate calculation to be performed can be determined by the configuration resistors 130 on the connector CCA 58. Once the value for the digital display 120 has been calculated, the FPGA 146 can use an internal look-up table to determine the number of LEDs 92 to illuminate in the arc. The FPGA 146 transmits both the number of LEDs 92 and the digital display 120 value to the LED CCA 52 through a serial interface. The brightness of the LEDs 92 in the arc, as well as the digital display 120, is independently controlled by the system control FPGA 146, which reads the NVIS switch and the ambient light level sensed by the ambient light sensor 96. Preferably, there is no software on the system control CCA 56. All of the processing functionality can be provided through the firmware loaded into the FPGA 146. Those skilled in the art will understand that the configurations of the power supply CCA 54, the system control CCA 56, and the connector CCA 58 are exemplary and that the configurations and types may vary and still be within the scope of the present invention.

The LED CCA 52 connects directly into the system control CCA 56 through male/female multi-pin sockets and receives control signals, power, and outputs status information. Preferably, the LED CCA 52 uses a serial interface from the system control FPGA 146 to determine which LEDs 92 to illuminate in the arc, as well as what segments to display in the digital display 120. LED driver circuitry 166, which is located on the back of the LED CCA 52, reads the serial interface and turns on the LEDs 92 accordingly. The brightness values of the digital display 120 and the arc of LEDs 92 are individually controllable by the system control FPGA 146. The FPGA 146 receives the ambient light level back sensed by the ambient light sensor 96 on the front of the LED CCA 52. This light level is used to slowly adjust the brightness of the indicator such that it is readable in direct sunlight but also not too bright in the shade. The FPGA 146 also controls the LEDs 94 behind the faceplate lettering such that the legends are visible in low light. The LED CCA 52 also transmits status information back to the system control FPGA 146 to indicate if any LEDs 92 and 94 have failed to illuminate.

A DDS waveform generator 148 receives commands from the system FPGA 146 and outputs a sine wave of a desired frequency. An amplifier 150 then scales the sine wave up into a larger AC signal. The EMI filtering and protection 152 reduces electromagnetic emissions and avoids susceptibility problems. The resulting signal 154 created by this chain of blocks excites or stimulates the aircraft sensor.

An aircraft cockpit having any number of conventional (electro-mechanical mechanism-based) indicator instruments can be retrofitted with electronic display-based instruments 10. Each such existing electro-mechanical indicator is removed from its opening in the cockpit control panel and replaced in the same opening with an electronic display-based indicator instrument 10 of the present invention. An indicator instrument 10 of the present invention can fit in the same panel opening as a conventional electro-mechanical indicator because they have the same form factor. As described above, the indicator instrument 10 that replaces the electro-mechanical indicator may even re-use the same housing. Pilots and regulatory authorities will be comfortable with and reassured by the presence of the familiar form factor and appearance of indicator instrument 10. The operation of the LED display 14 emulates that of electro-mechanical needle indicator mechanisms because the length of the band displayed indicates the quantity measured by the corresponding avionics sensor, but pilots will notice and appreciate that LED and LCD displays 14 and 120 of the instrument 10 are clearer, brighter and thus easier to read than conventional electro-mechanical indicators.

To assemble the instrument 10, the electronic subassembly 50 is assembled by connecting the system control CCA 56 and the power supply CCA 54 to the carrier 60. Each of the system control CCA 56 and the power supply CCA 54 are secured to the carrier 60 with four fasteners 64. The connector CCA 58 is connected to the system control CCA 56 and the power supply CCA 54 by mating male multi-pin connector sockets of the system control CCA and the power supply CCA with the female multi-pin connector sockets of the connector CCA. In so doing, the nubs 80 and 82 on the rear side of the carrier 60 fit snugly within the openings 84 an 86 in the connector CCA 58. The LED CCA 52 is secured to the front of the carrier 60 such that the nubs 70 and 72 on the front side of the carrier fit snugly within the holes 74 and 76 of the LED CCA.

The faceplate 12 is stacked on the front of the electronics subassembly 50 and the glass cover 20 is stacked on the front of the faceplate. The glass cover 20, faceplate 12, and the electronics subassembly 50 are slid into the tubular body 18 until the glass cover contacts and is retained by the bezel 22. The o-ring seal 28 is placed against rear of the tubular body 18, and the rear cap 24 is secured thereto by inserting the rear cap into the tubular body and securing three fasteners 32, 34, and 36 through the openings 44 in the tubular body and into the openings 38 40, and 42 in the rear cap 24. A rear nut 45 can be secured to the threaded boss 46 to further secure the connection.

In an example of retrofitting an existing electro-mechanical mechanism-based indicator, one removes the existing electro-mechanical assembly and any mounting hardware from the housing and replaces them with the electronic subassembly and its associated backplate and mounting hardware. In embodiments of the invention in which the physical structures and configurations of the removed and replaced structures differ from those described above with regard to the illustrated embodiment, the retrofitting method is essentially the same with accommodations made for such differences.

Different instruments or indicator types can all utilize substantially the same mechanical and electrical components with a few exceptions. Preferably, each type of indicator instrument (e.g., hydraulic pressure, hydraulic temperature, fluid level, fluid level for utility, and hydraulic pressure for utility) has a unique faceplate 12 and a unique connector CCA 58 with configuration settings. Thus, each type of indicator instrument 10 can have a different scale printed with indicia suitable for whatever quantity the instrument is intended to display, such as hydraulic temperature, hydraulic temperature, and so forth. However, each of the various indicator types can use the same arrangement of LED arc and seven-segment digital LED data presentation. Also preferably, each type of indicator instrument 10 has a unique keyed rear connector (while maintaining the same type and number of pins) so that the instrument cannot be plugged into an incorrect cable assembly in the control panel. Utilizing common components and subassemblies for various indicators contributes to minimizing recurring unit cost by helping to maintain quantities of components and circuit card assemblies at economical procurement and manufacturing levels.

Although the present invention has been described in terms of a hydraulic pressure instrument, persons skilled in the art to which the invention relates will readily be capable of designing suitable electronic subassemblies for any of the conventional indicator types, such as hydraulic temperature, fluid level, fluid level for utility, hydraulic pressure for utility, and so forth.

It will be apparent to those skilled in the art that various modifications and variations can be made to this invention without departing from the spirit or scope of the invention. Thus, it is intended that the present invention cover the modifications and variations of this invention provided that they come within the scope of the appended claims and their equivalents.

What is claimed is:

1. A replacement avionics display instrument for use in existing aircraft to replace an existing electro-mechanical instrument having an electro-mechanical display using a needle indicator, the aircraft having an instrument opening for receiving the electro-mechanical instrument and having electrical connections for supplying electrical signals to the electro-mechanical instrument, the replacement avionics display instrument comprising: an avionics housing either removed from such an aircraft or constructed to replicate such a housing, the avionics housing configured to fit in the existing instrument opening; an electronic display housed within the housing and having a display element for approximating the movement of a needle; and electronic circuitry coupled to the electronic display to allow the electronic display to be driven by the electrical input signals of the aircraft, whereby the replacement avionics display can be connected to the electrical inputs of the aircraft and installed in the existing opening in the aircraft.

2. A replacement avionics display instrument as claimed in claim 1 wherein the electronic display comprises an LED display.

3. A replacement avionics display instrument as claimed in claim 2 wherein the LED display comprises a plurality of LED elements arranged side-by-side in an arc.

4. A replacement avionics display instrument as claimed in claim 3 wherein the plurality of LED elements are driven in a manner in which only a selected one of the LED elements is illuminated at any one time.

5. A replacement avionics display instrument as claimed in claim 3 wherein the plurality of LED elements are driven in a manner in which multiple ones of the LED elements can be illuminated together.

6. A replacement avionics display instrument as claimed in claim 1 wherein the electronic display comprises an LED display with a printed scale, the LED display operating to indicate a measurement on the printed scale.

7. A replacement avionics display instrument as claimed in claim 6 further comprising a digital display indicating a measurement using displayed digits.

8. A replacement avionics display instrument as claimed in claim 6 further comprising an indicator light for indicating an atypical condition.

9. A replacement avionics display instrument as claimed in claim 1 wherein the electronic display comprises an LED display including a plurality of LED elements and a diffuser lens positioned in front of the LED elements.

10. A replacement avionics display instrument as claimed in claim 9 wherein the diffuser lens comprises an acrylic panel clad with a film, the film having a non-smooth outer surface.

11. A replacement avionics display instrument as claimed in claim 10 wherein the diffuser film is translucent.

12. An avionics display instrument for use with an aircraft having electrical connections for supplying electrical signals, the avionics display instrument comprising: an electronic display for mimicking an electro-mechanical instrument having an electro-mechanical display using a needle indicator instrument; and an electronics subassembly for receiving the electrical signals from electrical connections of the aircraft and using the electrical input signals to activate the electronic display.

13. The avionics display instrument of claim 12, wherein the electronic display further comprises a plurality of light emitting diodes and a legend, wherein the electronic subassembly operates to indicate a measurement on the legend by activating one or more light emitting diodes.

14. The avionics display instrument of claim 13, wherein the light emitting diodes are arranged side-by-side in the form of an arc.

15. The avionics display instrument of claim 14, wherein a band of light emitting diodes is activated from a starting value to a sensed value.

16. The avionics display instrument of claim 14, wherein a single light emitting diode activated.

17. The avionics display instrument of claim 14, wherein the electronic display further comprises a light-emitting display for displaying a digital value of the measurement.

18. The avionics display instrument of claim 12, further comprising an ambient light sensor for determining the ambient light, wherein the electronic subassembly adjusts illumination of light emitting diodes based on the value sensed by the ambient light sensor.

19. The avionics display instrument of claim 12, further comprising a diffuser lens, wherein the diffuser lens provides a sharp transition from light to dark and blends the light emitted from a plurality of light emitting diodes together.

* * * * *